(12) United States Patent
Whitney et al.

(10) Patent No.: US 9,341,150 B2
(45) Date of Patent: May 17, 2016

(54) THROTTLE CONTROL SYSTEMS AND METHODS FOR REDUCING INDUCTION NOISE

(71) Applicant: GM GLOBAL TECHNOLOGY OPERATIONS LLC, Detroit, MI (US)

(72) Inventors: Christopher E. Whitney, Commerce, MI (US); Jeffrey M. Kaiser, Highland, MI (US)

(73) Assignee: GM Global Technology Operations LLC, Detroit, MI (US)

(*) Notice: Subject to any disclaimer, the term of this patent is extended or adjusted under 35 U.S.C. 154(b) by 592 days.

(21) Appl. No.: 13/756,682

(22) Filed: Feb. 1, 2013

(65) Prior Publication Data

US 2014/0123938 A1    May 8, 2014

Related U.S. Application Data

(60) Provisional application No. 61/722,956, filed on Nov. 6, 2012.

(51) Int. Cl.
| F02M 35/12 | (2006.01) |
| F02D 11/10 | (2006.01) |
| F02D 37/02 | (2006.01) |
| F02D 41/00 | (2006.01) |
| F02D 41/18 | (2006.01) |
| F02D 41/14 | (2006.01) |

(52) U.S. Cl.
CPC ......... *F02M 35/1211* (2013.01); *F02D 11/105* (2013.01); *F02D 37/02* (2013.01); *F02D 41/0002* (2013.01); *F02D 41/0007* (2013.01); *F02D 41/18* (2013.01); *F02D 2041/001* (2013.01); *F02D 2041/1412* (2013.01); *F02D 2200/0406* (2013.01); *F02D 2250/21* (2013.01); *F02D 2250/22* (2013.01); *F02D 2250/24* (2013.01); *F02M 35/12* (2013.01); *Y02T 10/42* (2013.01)

(58) Field of Classification Search
CPC ............ F02D 41/0002; F02D 2250/22; F02D 2250/24; F02D 2200/0406; F02D 2200/101; F02D 2200/025; F02D 11/105; F02M 35/12; F02M 35/1205; F02M 35/1211; F02B 27/0268; F02B 27/001
USPC ......... 123/184.53, 184.57, 300; 701/103, 110
See application file for complete search history.

(56) References Cited

U.S. PATENT DOCUMENTS

| 5,692,052 | A  | * | 11/1997 | Tanaka et al. ................. 381/71.9 |
| 6,427,661 | B1 | * | 8/2002  | Spannbauer .................. 123/337 |
| 6,755,182 | B1 | * | 6/2004  | Kolmanovsky et al. ...... 123/478 |
| 6,848,301 | B2 | * | 2/2005  | Kondo ......................... 73/114.33 |
| 6,880,523 | B2 | * | 4/2005  | Iwasaki et al. ............ 123/339.12 |
| 7,464,674 | B2 | * | 12/2008 | Michelini et al. .......... 123/90.11 |

* cited by examiner

*Primary Examiner* — Lindsay Low
*Assistant Examiner* — Robert Werner

(57) ABSTRACT

A throttle control system includes a target pressure module, a torque determination module, and a target opening module. The target pressure module determines an induction noise value based on an engine operating parameter and determines a target pressure downstream of a throttle valve of an engine based on a pressure at an inlet of the throttle valve and the induction noise value. The torque determination module determines a torque request for the engine based on the target pressure. The target opening module determines a target opening for the throttle valve based on the torque request and selectively adjusts opening of the throttle valve based on the target opening.

16 Claims, 10 Drawing Sheets

THROTTLE CONTROL SYSTEMS AND METHODS FOR REDUCING INDUCTION NOISE

CROSS-REFERENCE TO RELATED APPLICATIONS

This application claims the benefit of U.S. Provisional Application No. 61/722,956, filed on Nov. 6, 2012. The disclosure of the above application is incorporated herein by reference in its entirety.

FIELD

The present disclosure relates to engine control systems and methods and more particularly to throttle control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air is drawn into an engine via an air intake system. The air intake system may include, for example, an air intake pipe, a first tube, an air filter housing, an air filter, a second tube, a mass airflow (MAF) sensor, a third tube, a throttle valve, an intake manifold.

Ambient air flows into the air intake system through the air intake pipe. The first tube receives air from the air intake pipe. Air flows from the first tube, through the air filter, to the second tube. The air filter is implemented within the air filter housing. The MAF sensor receives air from the second tube, and the third tube receives air from the MAF sensor. The throttle valve receives air via the third tube, and regulates airflow into the air intake system. Air flowing through the throttle valve flows into the intake manifold. Air may flow from the intake manifold into cylinders of the engine via intake valve(s) of the cylinders.

SUMMARY

A throttle control system includes a target pressure module, a torque determination module, and a target opening module. The target pressure module determines an induction noise value based on an engine operating parameter and determines a target pressure downstream of a throttle valve of an engine based on a pressure at an inlet of the throttle valve and the induction noise value. The torque determination module determines a torque request for the engine based on the target pressure. The target opening module determines a target opening for the throttle valve based on the torque request and selectively adjusts opening of the throttle valve based on the target opening.

A throttle control method includes: determining an induction noise value based on an engine operating parameter; and determining a target pressure downstream of a throttle valve of an engine based on a pressure at an inlet of the throttle valve and the induction noise value. The throttle control method further includes: determining a torque request for the engine based on the target pressure; and determining a target opening for the throttle valve based on the torque request. The throttle control method further includes selectively adjusting opening of the throttle valve based on the target opening.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control module (ECM) controls torque output of an engine. More specifically, the ECM controls actuators of the engine based on target values, respectively, to produce a target engine torque output. For example, the ECM may control intake and exhaust cam phasers based on target intake and exhaust cam phaser angles, a throttle valve based on a target throttle opening, an exhaust gas recirculation (EGR) valve based on a target EGR opening, and a boost device based on a target boost.

The throttle valve controls airflow into the intake manifold. The intake valves control airflow into cylinders of the engine. More specifically, a charge of air is drawn into a cylinder during the period when the intake valve(s) of the cylinder is/are open. Closing of the intake valve(s) of a cylinder discontinues airflow into the cylinder and traps air within the cylinder.

However, intake valve opening and closing may cause pressure waves within the intake manifold. These pressure waves may migrate out of an air intake system of the engine and may cause audible noise within a passenger cabin of a vehicle under some circumstances.

For example, when the engine speed is less than a predetermined speed (e.g., approximately 2000 revolutions per minute (RPM)), the pressure waves may cause audible noise within the passenger cabin. When the engine speed is greater than the predetermined speed, components of the air intake system may attenuate the pressure waves and prevent or minimize audible noise. However, the components of the air intake system may be unable to attenuate the pressure waves when the engine speed is less than the predetermined speed.

The ECM of the present disclosure determines a target pressure downstream of a throttle valve of an engine based on a pressure at an inlet of the throttle valve and an induction noise value. The ECM determines the induction noise value such that the throttle valve will be open to a lesser extent at times when the air intake system may be unable to attenuate the pressure waves and induction noise may be heard within the passenger cabin. The ECM determines a torque request based on the target pressure downstream of the throttle valve and determines the target throttle opening based on the torque request.

Based on the target throttle opening, the throttle valve will therefore be open to a lesser extent than it otherwise may have been. The throttle valve therefore may trap some of the pressure waves within the air intake system where the pressure waves cancel or attenuate each other to limit induction noise.

Figure 1:
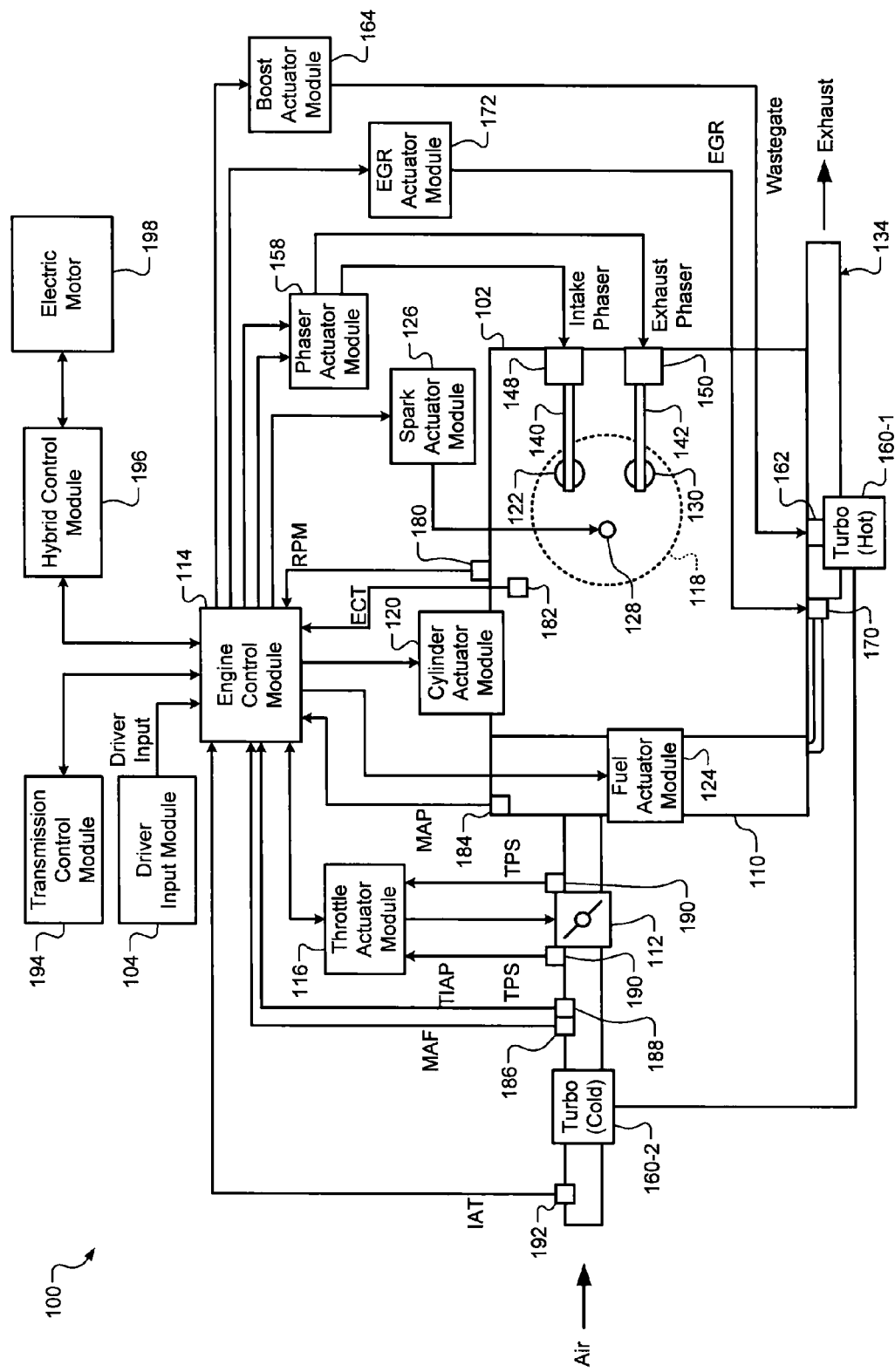
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. While not shown, the engine 102 may be a compression-ignition engine, in which case compression within the cylinder 118 ignites the air/fuel mixture. Alternatively, as shown, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. The spark actuator module 126 may halt provision of spark to deactivated cylinders. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as camless valve actuators.

The time when the intake valve 122 is opened may be varied with respect to piston TDC by an intake camshaft phaser 148. The time when the exhaust valve 130 is opened may be varied with respect to piston TDC by an exhaust camshaft phaser 150. A phaser actuator module 158 may control the intake camshaft phaser 148 and the exhaust camshaft phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. The ECM 114 may control the turbocharger via a boost actuator module 164. The boost actuator module 164 may modulate the boost of the turbocharger by controlling opening of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

A pressure at an inlet of the throttle valve 112 may be measured using a throttle inlet air pressure (TIAP) sensor 188. The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The engine system 100 may also include one or more other sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator. Each system receives a target actuator value. For example, the throttle actuator module 116 may be referred to as an actuator, and a target throttle opening area may be referred to as the target actuator value. In the example of FIG. 1, the throttle actuator module 116 achieves the target throttle opening area by adjusting an angle of the blade of the throttle valve 112.

Similarly, the spark actuator module 126 may be referred to as an actuator, while the corresponding target actuator value may be a target spark timing relative to piston TDC. Other actuators may include the cylinder actuator module 120, the fuel actuator module 124, the phaser actuator module 158, the boost actuator module 164, and the EGR actuator module 172. For these actuators, the target actuator values may include target number of activated cylinders, target fueling parameters, target intake and exhaust cam phaser angles, target wastegate duty cycle, and target EGR valve opening area, respectively. The ECM 114 may generate the target actuator values to cause the engine 102 to generate a target engine output torque.

Figure 2:
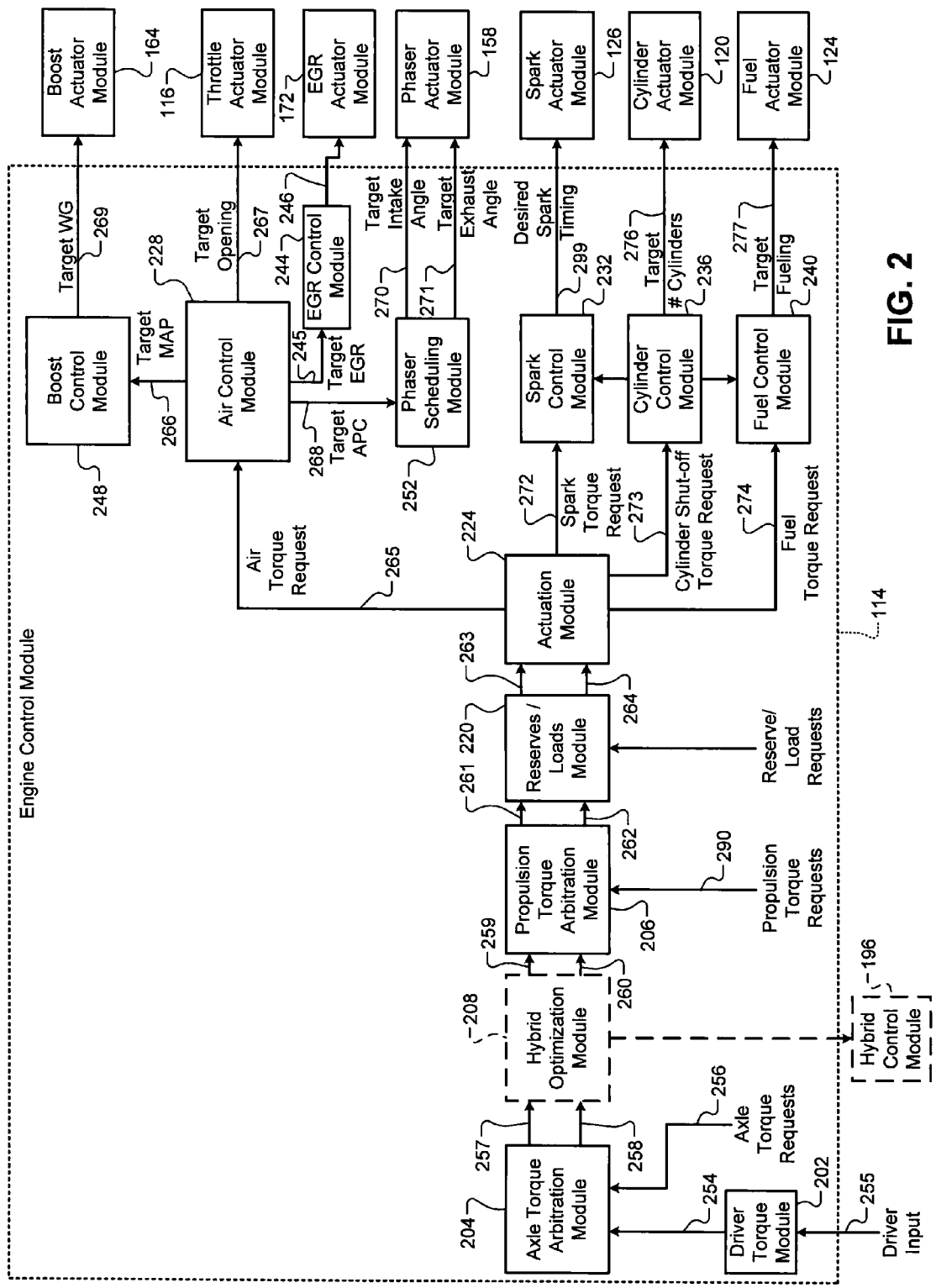
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, an actuation module 224, an air control module 228, a spark control module 232, a cylinder control module 236, and a fuel control module 240. The ECM 114 also includes an EGR control module 244, a boost control module 248, and a phaser control module 252.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the actuators of the engine system 100.

In general terms, the immediate torque request 258 is the amount of currently target axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the target actuator values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. As described in more detail below, fast engine actuators are defined in contrast with slow engine actuators.

In various implementations, fast engine actuators are capable of varying axle torque within a range, where the range is established by the slow engine actuators. The upper limit of the range is the predicted torque request 257, while the lower limit of the range is limited by the torque (varying) capacity of the fast actuators. For example only, fast actuators may only be able to reduce axle torque by a first amount, where the first amount is a measure of the torque capacity of the fast actuators. The first amount may vary based on engine operating conditions set by the slow engine actuators.

When the immediate torque request 258 is within the range, fast engine actuators can be controlled to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can change the axle torque more quickly than slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set target actuator values for fast actuators to values that, given the slow actuator values, cause the engine system 100 to produce the immediate torque request 258 instead of the predicted torque request 257.

The fast actuators therefore cause the engine system 100 to produce the immediate torque request 258. When the ECM 114 decides to transition the axle torque from the immediate torque request 258 to the predicted torque request 257, the ECM 114 changes the target actuator values for one or more fast actuators to values that correspond to the predicted torque request 257. Because the target actuator values for the slow actuators have already been set based on the predicted torque request 257, the engine system 100 is able to produce the predicted torque request 257 after only the (minimal) delay imposed by the fast actuators. In other words, the longer delay that would otherwise result from changing axle torque using slow actuators is avoided.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening may be used as an actuator value for engine characteristics other than torque. Compression-ignition engines may combust fuels including, for example, diesel fuel, via compression.

When the engine 102 is a spark-ignition engine, the spark actuator module 126 may be a fast actuator and the throttle actuator module 116 may be a slow actuator. After receiving a new target actuator value, the spark actuator module 126 may be able to change spark timing for the following firing event. When the spark timing (also called spark advance) for a firing event is set to an optimum value, a maximum amount of torque may be produced in the combustion stroke immediately following the firing event. However, a spark timing deviating from the optimum value may reduce the amount of torque produced in the combustion stroke. Therefore, the spark actuator module 126 may be able to vary engine output torque as soon as the next firing event occurs by varying spark timing. For example only, a table of optimum spark timings corresponding to different engine operating conditions may be determined during a calibration phase of vehicle design, and the optimum value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new target actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening area.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare (rapid rise) in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other (e.g., fast) actuators.

Target actuator values for airflow controlling actuators may be determined based on the air torque request 265. For example only, the air control module 228 (see also FIG. 3) may determine a target manifold absolute pressure (MAP) 266, a target throttle opening (e.g., area) 267, a target air per cylinder (APC) 268, and a target EGR flowrate 245 based on the air torque request 265.

The air control module 228 may output the target throttle opening 267 to the throttle actuator module 116. The throttle actuator module 116 regulates the throttle valve 112 to produce the target throttle opening 267. The boost control module 248 may determine a target duty cycle 269 for the wastegate 162 based on the target MAP 266. The boost actuator module 164 may control the duty cycle applied to the wastegate 162 based on the target duty cycle 269. While the target duty cycle 269 will be discussed, the boost control module 248 may determine another suitable value for controlling the wastegate 162.

The phaser control module 252 may determine target intake and exhaust cam phaser angles 270 and 271 based on the target APC 268. Based on the target APC 268 and the engine speed (and/or crankshaft position), the phaser control module 252 may control positions of the intake and/or exhaust camshaft phasers 148 and 150 via the phaser actuator module 158. The EGR control module 244 may determine a target EGR opening 246 based on the target EGR flowrate 245. The EGR actuator module 172 regulates the EGR valve 170 to produce the target EGR opening 246.

The actuation module 224 may also generate a spark torque request 272, a cylinder shut-off torque request 273, and a fuel torque request 274. The spark control module 232 may determine how much to retard the spark timing (which reduces engine output torque) from an optimum spark timing based on the spark torque request 272. For example only, a torque relationship may be inverted to solve for a desired spark timing 299. For a given torque request ($T_{des}$), the desired spark timing ($S_{des}$) 299 may be determined based on:

$$S_{des} = f^{-1}(T_{des}, APC, I, E, AF, OT, \#). \tag{1}$$

This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors. The engine output torque at the optimum spark timing may therefore be less than MBT.

The cylinder shut-off torque request 273 may be used by the cylinder control module 236 to determine a target number of cylinders to deactivate 276. The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 274. More specifically, the fuel control module 240 may generate target fueling parameters 277 based on the fuel torque request 274. The target fueling parameters 277 may include, for example, target mass of fuel, target injection starting timing, and target number of fuel injections.

During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a target fuel mass that will yield stoichiometric combustion when combined with a present mass of air per cylinder (APC).

In compression-ignition systems, the fuel control module 240 may operate in a fuel lead mode in which the fuel control module 240 determines a target fuel mass for each cylinder that satisfies the fuel torque request 274 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

Figure 3:
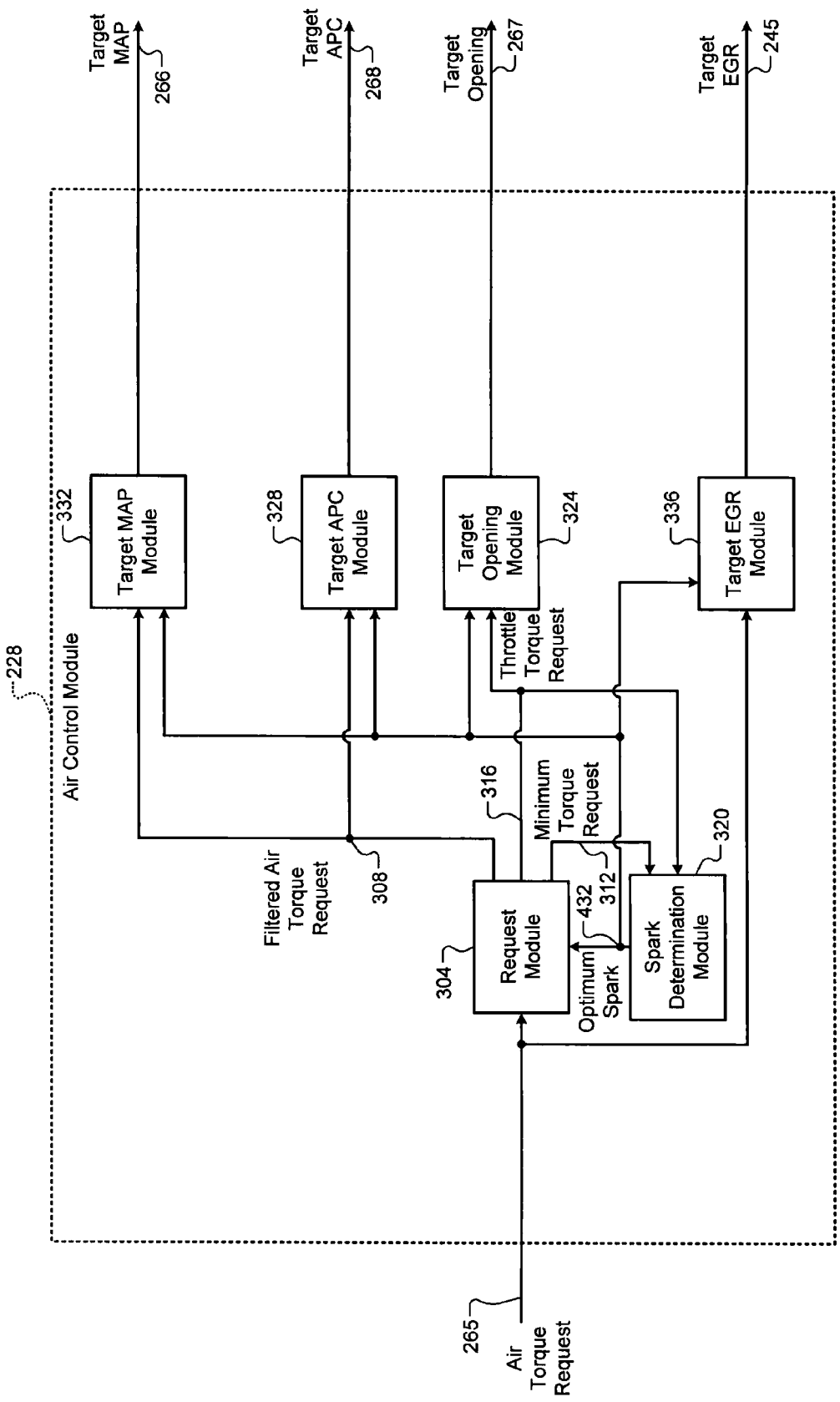
FIG. 3 is a functional block diagram of an example air control module according to the present disclosure.

Referring now to FIG. 3, a functional block diagram of an example implementation of the air control module 228 is presented. A request module 304 receives the air torque request 265. The request module 304 may filter the air torque request 265 to produce a filtered air torque request 308. The request module 304 generates a minimum torque request 312 and a throttle torque request 316 based on the air torque request 265.

Figure 4:
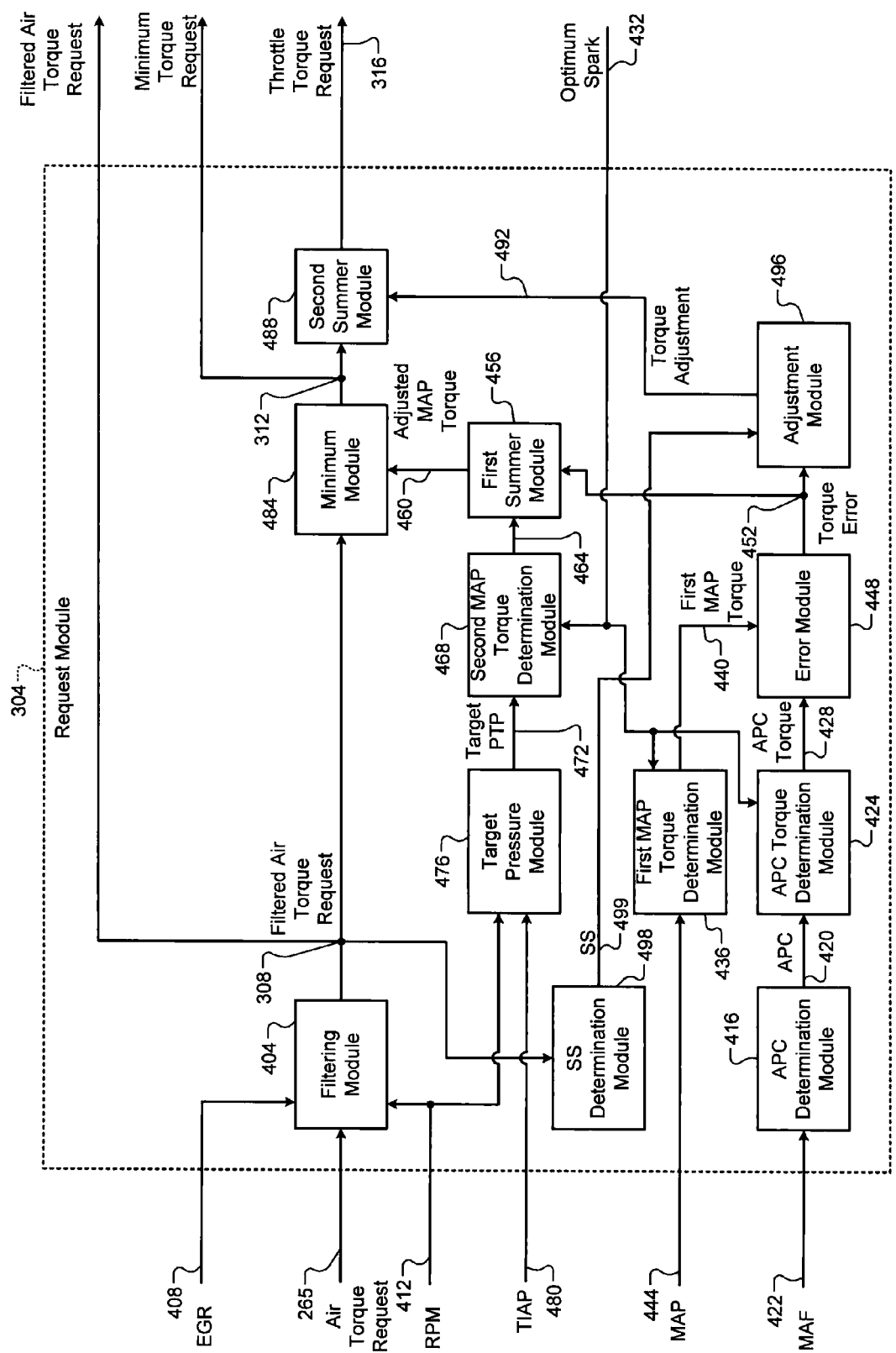
FIG. 4 is a functional block diagram of an example request module according to the present disclosure.

FIG. 4 is a functional block diagram of an example implementation of the request module 304. Referring now to FIGS. 3 and 4, a filtering module 404 filters the air torque request 265 to produce the filtered air torque request 308. For example, the filtering module 404 stores the air torque request 265 for a delay period before using the stored air torque request as a delayed air torque request (not shown). The filtering module 404 may determine the delay period based on an EGR value (e.g., opening or mass flow rate) 408 and/or an engine speed (RPM) 412.

The filtering module 404 also selectively applies a rate limit to the delayed air torque request to produce the filtered air torque request 308. The filtering module 404 applies the rate limit when the delayed air torque request when the air torque request 265 is decreasing. Application of the rate limit includes adjusting the filtered air torque request 308 toward the delayed air torque request by up to a maximum amount per predetermined period. The filtering module 404 may determine the maximum amount (of the rate limit) based on the EGR value 408 and/or the engine speed 412. While delaying and rate limiting shaping actions have been described, one or more other filtering actions may also be performed.

An APC determination module 416 determines an APC 420 of the engine 102 based on a MAF 422 measured using the MAF sensor 186. For example, the APC determination module 416 may determine the APC 420 using a function or a mapping that relates the MAF 422 to the APC 420. The APC 420 may correspond to an estimated amount (e.g., mass) of air that will be drawn into the cylinders of the engine 102.

An APC torque determination module 424 generates an APC estimated torque 428 of the engine 102 based on the APC 420. The APC estimated torque 428 corresponds to an estimated value of the engine torque output determined based on the APC 420. The APC torque determination module 424 determines the APC estimated torque 428 based on the APC 420 and other engine operating parameters. For example, the APC torque determination module 424 may determine the APC estimated torque 428 using the relationship:

$$T_{APC} = f(APC, RPM, S, I, E, AF, OT, \#), \tag{2}$$

where $T_{APC}$ is the APC estimated torque 428, APC is the APC 420, RPM is the engine speed 412, S is an optimum spark timing 432, I is an intake cam phaser angle, E is an exhaust cam phaser angle, AF is an air/fuel ratio being used by the fuel actuator module 124, OT is the oil temperature, and # is the present number of cylinders that are activated. The relationship may be embodied as an equation or as a look-up table. The optimum spark timing 432 is discussed further below in conjunction with the example of FIG. 5.

A first MAP torque determination module 436 generates a first MAP estimated torque 440 of the engine 102 based on a MAP 444 measured using the MAP sensor 184. The first MAP estimated torque 440 corresponds to an estimated value of the engine torque output determined based on the MAP 444. The first MAP torque determination module 436 determines the first MAP estimated torque 440 based on the MAP 444 and other engine operating parameters. For example, the first MAP torque determination module 436 may determine the first MAP estimated torque 440 using the relationship:

$$T_{MAP1}=f(MAP,RPM,S,I,E,AF,OT,\#), \quad (3)$$

where $T_{MAP1}$ is the first MAP estimated torque 440, MAP is the MAP 444, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, and # is the present number of cylinders that are activated. The relationship may be embodied as an equation or as a look-up table.

An error module 448 generates a torque error 452 based on a difference between the APC estimated torque 428 and the first MAP estimated torque 440. A first summer module 456 generates an adjusted MAP torque request 460 based on the torque error 452 and a second MAP estimated torque 464. For example, the first summer module 456 may set the adjusted MAP torque request 460 based on or equal to a sum of the torque error 452 and the second MAP estimated torque 464.

A second MAP torque determination module 468 generates the second MAP estimated torque 464 of the engine 102 based on a target post throttle pressure (PTP) 472. The second MAP estimated torque 464 corresponds to an estimated value of the engine torque output determined based on the target PTP 472. The second MAP torque determination module 468 determines the second MAP estimated torque 464 based on the target PTP 472 and other engine operating parameters. For example, the second MAP torque determination module 468 may determine the second MAP estimated torque 464 using the relationship:

$$T_{MAP2}=f(TPTP,RPM,S,I,E,AF,OT,\#), \quad (4)$$

where $T_{MAP2}$ is the second MAP estimated torque 464, TPTP is the target PTP 472, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, and # is the present number of cylinders that are activated. The relationship may be embodied as an equation or as a look-up table.

A target pressure module 476 determines the target PTP 472 based on the engine speed 412 and a throttle inlet air pressure (TIAP) 480. For example, the target pressure module 476 may set the target PTP 472 equal to the TIAP 480 multiplied by an induction noise value or equal to the TIAP 480 plus the induction noise value. The target PTP 472 may also be referred to as a target MAP because the PTP may be approximately equal to the MAP. The TIAP 480 may be measured using the TIAP sensor 188. While multiplication and addition is provided as examples, subtraction, division, or another suitable method may be used to determine the target PTP 472.

The target pressure module 476 sets the induction noise value based on the engine speed 412. In implementations where multiplication of the TIAP 480 and the induction noise value is used, the induction noise value may be a value between 0 and 1, inclusive. The target pressure module 476 may set the induction noise value using one of a function and a mapping that relates the engine speed 412 to the induction noise value. For example, the target pressure module 476 may set the induction noise value to a first predetermined value when the engine speed 412 is less than a predetermined speed and set the induction noise value to 1 when the engine speed 412 is greater than the predetermined speed. The predetermined value may be calibratable and may be set, for example, to approximately 0.97 or 0.98 or another suitable value that is less than 1. The predetermined speed may be calibratable and may be set, for example, to approximately 2000 RPM-2500 RPM or another suitable speed.

In implementations where summation of the TIAP 480 and the induction noise value is used, the induction noise value may be a value that is 0 or negative. The target pressure module 476 may set the induction noise value to a second predetermined value when the engine speed 412 is less than the predetermined speed and set the induction noise value to 0 when the engine speed 412 is greater than the predetermined speed. The second predetermined value may be less than zero.

A minimum module 484 receives the filtered air torque request 308 and the adjusted MAP torque request 460. The minimum module 484 selects a minimum (lesser) one of the filtered air torque request 308 and the adjusted MAP torque request 460. The minimum module 484 outputs the selected one of the torque requests as the minimum torque request 312.

A second summer module 488 generates the throttle torque request 316 based on the minimum torque request 312 and a (closed-loop) torque adjustment 492. For example, the second summer module 488 may set the throttle torque request 316 based on or equal to a sum of the minimum torque request 312 and the torque adjustment 492.

An adjustment module 496 generates the torque adjustment 492 based on the torque error 452. For example, the adjustment module 496 may generate the torque adjustment 492 using a proportional (P), proportional integral (PI), integral (I), or proportional, integral, derivative (PID) closed-loop control scheme or another suitable type of closed-loop controller.

The adjustment module 496 may selectively adjust the control scheme used based on whether steady-state (SS) operating conditions are present. A SS determination module 498 may determine whether SS operating conditions are present, for example, based on the filtered air torque request 308 and/or one or more other suitable parameters. For example, the SS determination module 498 may determine that SS operating conditions are present when a change in the filtered air torque request 308 over a predetermined period is less than a predetermined amount. The SS determination module 498 may indicate whether SS operating conditions are present via a SS signal 499.

Figure 5:
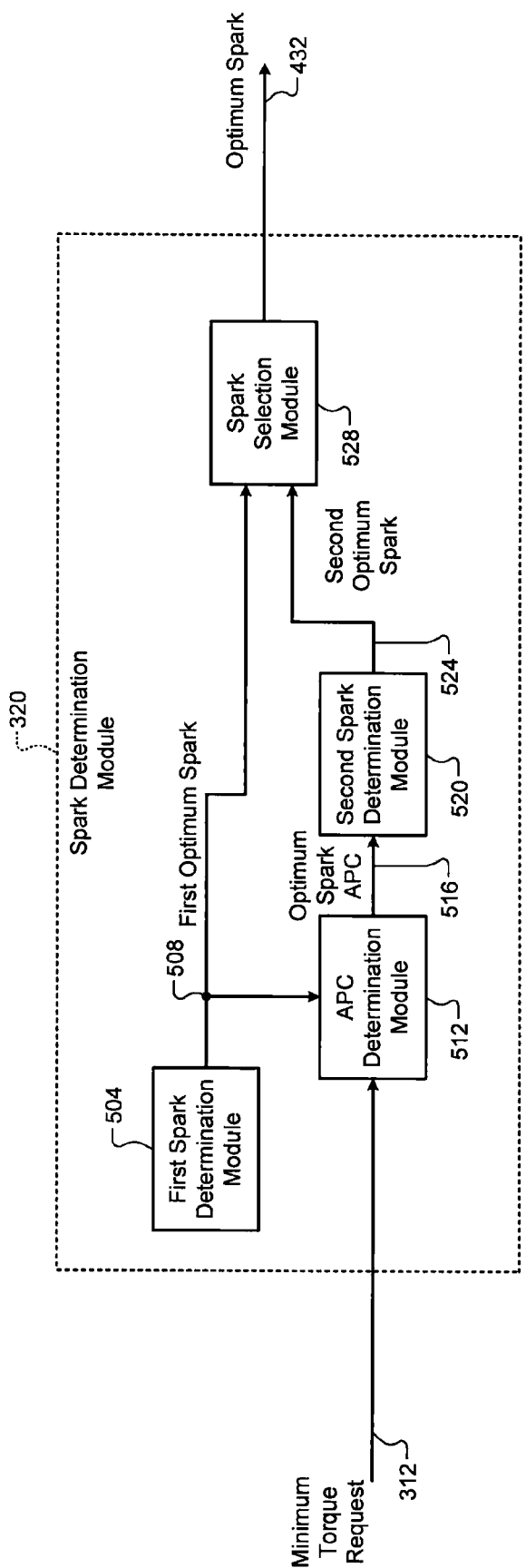
FIG. 5 is a functional block diagram of an example spark determination module according to the present disclosure.

As shown in FIG. 3, a spark determination module 320 generates the optimum spark timing 432. FIG. 5 includes a functional block diagram of an example implementation of the spark determination module 320. Referring now to FIGS. 3 and 5, a first spark determination module 504 determines a first optimum spark timing 508 based on current operating conditions. For example, the first spark determination module 504 may determine the first optimum spark timing 508 using the table that relates the current conditions to optimum spark timing that allows the engine 102 to produce a maximum torque possible for the current conditions.

An APC determination module 512 generates an optimum spark APC 516 based on the minimum torque request 312 and the first optimum spark timing 508. The optimum spark APC 516 may correspond to an estimated amount (e.g., mass) of air that will be drawn into the cylinders of the engine 102 with the minimum torque request 312 and the first optimum spark timing 508. The APC determination module 512 determines the optimum spark APC 516 further based on other engine operating parameters. For example, the APC determination module 512 may determine the optimum spark APC 516 using the relationship:

$$APC_{SPARK}=f^{-1}(T_{MIN},RPM,S,I,E,AF,OT,\#), \quad (5)$$

where $APC_{SPARK}$ is the optimum spark APC 516, $T_{MIN}$ is the minimum torque request 312, RPM is the engine speed 412, S is the first optimum spark timing 508, I is an intake cam phaser angle, E is an exhaust cam phaser angle, AF is an air/fuel ratio being used by the fuel actuator module 124, OT is the oil temperature, # is the present number of cylinders that are activated, and $f^{-1}$ denotes inversion of the relationship between APC and torque underlying, for example, relationship (2), described above. The relationship may be embodied as an equation or as a look-up table.

A second spark determination module 520 determines a second optimum spark timing 524 based on the optimum spark APC 516. For example, the second spark determination module 520 may determine the second optimum spark timing 524 using a function or a mapping that relates the optimum spark APC 516 to optimum spark timing.

A spark selection module 528 receives the first optimum spark timing 508 and the second optimum spark timing 524. The spark selection module 528 selects one of the first optimum spark timing 508 and the second optimum spark timing 524. The spark selection module 528 outputs the selected one of the first and second optimum spark timings 508 and 524 as the optimum spark timing 432.

The spark selection module 528 may select one of the first optimum spark timing 508 and the second optimum spark timing 524, for example, based on the air torque request 265 and/or another torque request. For example, the spark selection module 528 may select the second optimum spark timing 524 when the air torque request 265 is increasing and select the first optimum spark timing 508 when the air torque request 265 is not increasing. This enables the optimum spark timing 432 to be set based on the future system conditions as opposed to adjusting the optimum spark timing 432 iteratively.

Figure 6:
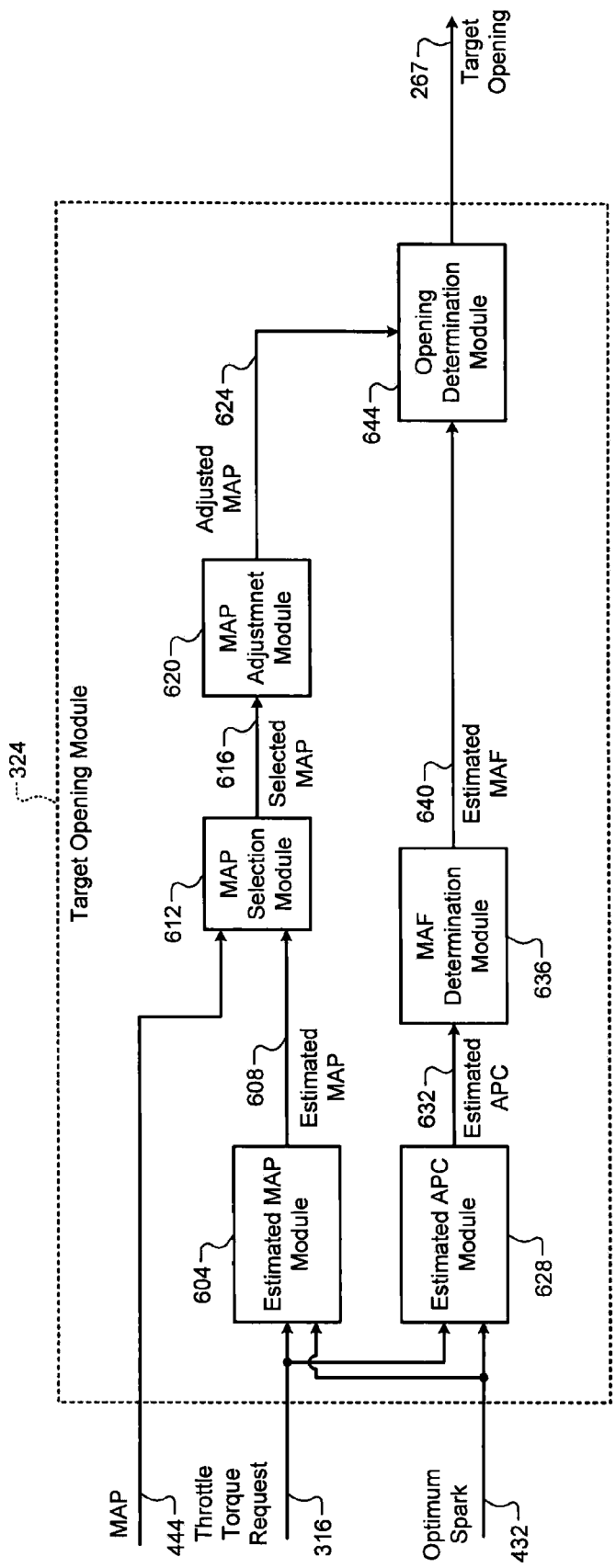
FIG. 6 is a functional block diagram of an example target opening module according to the present disclosure.

As shown in FIG. 3, a target opening module 324 generates the target throttle opening 267 based on the throttle torque request 316 and the optimum spark timing 432. FIG. 6 is a functional block diagram of an example implementation of the target opening module 324.

Referring now to FIGS. 3 and 6, an estimated MAP module 604 generates an estimated MAP 608 based on the throttle torque request 316 and the optimum spark timing 432. The estimated MAP 608 may correspond to an estimated MAP that will be present with the throttle torque request 316 and the optimum spark timing 432. The estimated MAP module 604 determines the estimated MAP 608 further based on other engine operating parameters. For example, the estimated MAP module 604 may determine the estimated MAP 608 using the relationship:

$$MAP_{EST}=f^{-1}(T_T,RPM,S,I,E,AF,OT,\#), \quad (6)$$

where $MAP_{EST}$ is the estimated MAP 608, $T_T$ is the throttle torque request 316, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, # is the present number of cylinders that are activated, and $f^{-1}$ denotes inversion of the relationship between MAP and torque underlying, for example, relationships (3) and (4), described above. The relationship may be embodied as an equation or as a look-up table. The estimated MAP module 604 may also adjust the estimated MAP 608 based on whether a supercharger is included. For example, the estimated MAP module 604 may decrease the estimated MAP 608 when a supercharger is included.

A MAP selection module 612 receives the estimated MAP 608 and the MAP 444. The MAP selection module 612 selects one of the estimated MAP 608 and the MAP 444. The MAP selection module 612 outputs the selected one of the estimated MAP 608 and the MAP 444 as a selected MAP 616.

The MAP selection module 612 may select one of the estimated MAP 608 and the MAP 444, for example, based on whether the engine 102 is idling. For example, the MAP selection module 612 may select the MAP 444 when the engine 102 is idling and select the estimated MAP 608 when the engine 102 is not idling.

A MAP adjustment module 620 generates an adjusted MAP 624 based on the selected MAP 616. For example, the MAP adjustment module 620 may set the adjusted MAP 624 based on or equal to a sum of the selected MAP 616 and a predetermined offset. The predetermined offset may be calibratable and may be set, for example, based on a minimum pressure needed to begin opening the wastegate 162.

An estimated APC module 628 generates an estimated APC 632 based on the optimum spark timing 432 and the throttle torque request 316. The estimated APC 632 may correspond to an estimated amount (e.g., mass) of air that will be drawn into the cylinders of the engine 102 with the throttle torque request 316 and the optimum spark timing 432. The estimated APC module 628 determines the estimated APC 632 further based on other engine operating parameters. For example, the estimated APC module 628 may determine the estimated APC 632 using the relationship:

$$APC_{EST}=f^{-1}(T_T,RPM,S,I,E,AF,OT,\#), \quad (7)$$

where $APC_{EST}$ is the estimated APC 632, $T_T$ is the throttle torque request 316, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, # is the present number of cylinders that are activated, and $f^{-1}$ denotes inversion of the relationship between APC and torque underlying, for example, relationships (2) and (5), described above. The relationship may be embodied as an equation or as a look-up table.

A MAF determination module 636 determines an estimated MAF 640 based on the estimated APC 632 and a period between firing events of the engine 102. The MAF determination module 636 may determine the estimated MAF 640 using a function or a mapping that relates the estimated APC 632 and the firing period to the estimated MAF 640. For example, the MAF determination module 636 may set the estimated MAF 640 based on or equal to the estimated APC 632 divided by the firing period.

An opening determination module 644 generates the target throttle opening 267 based on the adjusted MAP 624 and the estimated MAF 640. For example the opening determination module 644 may determine the target throttle opening 267 using the relationship:

$$OPEN_T = \frac{MAF_{EST} * \sqrt{R_{GAS} * T}}{B * \Phi\left(\frac{MAP_{ADJ}}{B}\right)}, \quad (8)$$

where $OPEN_T$ is the target throttle opening 267, $MAF_{EST}$ is the estimated MAF 640, $MAP_{ADJ}$ is the adjusted MAP 624, $R_{GAS}$ is the ideal gas constant, T is the air temperature (e.g., ambient or intake), B is the barometric pressure, and $\phi$ represents an air density function. As stated above, the throttle actuator module 116 controls the throttle valve 112 based on the target throttle opening 267.

Figure 7:
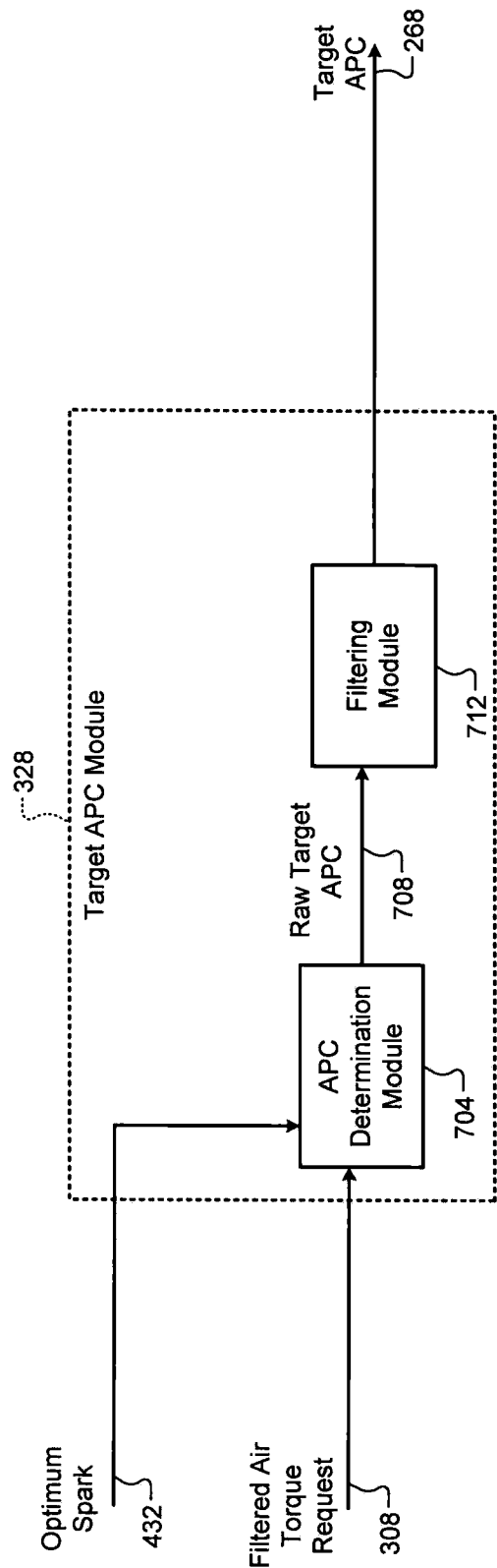
FIG. 7 is a functional block diagram of an example target air per cylinder (APC) module according to the present disclosure.

As shown in FIG. 3, a target APC module 328 generates the target APC 268 based on the filtered air torque request 308 and the optimum spark timing 432. FIG. 7 is a functional block diagram of an example implementation of the target APC module 328.

Referring now to FIGS. 3 and 7, an APC determination module 704 determines a raw target APC 708 based on the filtered air torque request 308 and the optimum spark timing 432. The raw target APC 708 may correspond to an estimated amount (e.g., mass) of air that will be drawn into the cylinders of the engine 102 with the filtered air torque request 308 and the optimum spark timing 432. The APC determination module 704 determines the raw target APC 708 further based on other engine operating parameters. For example, the APC determination module 704 may generate the raw target APC 708 using the relationship:

$$APC_{RAW} = f^{-1}(T_F, RPM, S, I, E, AF, OT, \#), \qquad (9)$$

where $APC_{RAW}$ is the raw target APC 708, $T_F$ is the filtered air torque request 308, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, # is the present number of cylinders that are activated, and $f^{-1}$ denotes inversion of the relationship between APC and torque underlying, for example, relationships (2), (5), and (7), described above. The relationship may be embodied as an equation or as a look-up table.

A filtering module 712 applies one or more filters to the raw target APC 708 to produce the target APC 268. For example, the filtering module 712 may scale and filter the raw target APC 708 to produce the target APC 268. As stated above, the phaser control module 252 generates target intake and exhaust cam phaser angles 270 and 271 based on the target APC 268, and the power actuator module 158 controls the intake and exhaust camshaft phasers 148 and 150 based on the target intake and exhaust cam phaser angles 270 and 271.

Figure 8:
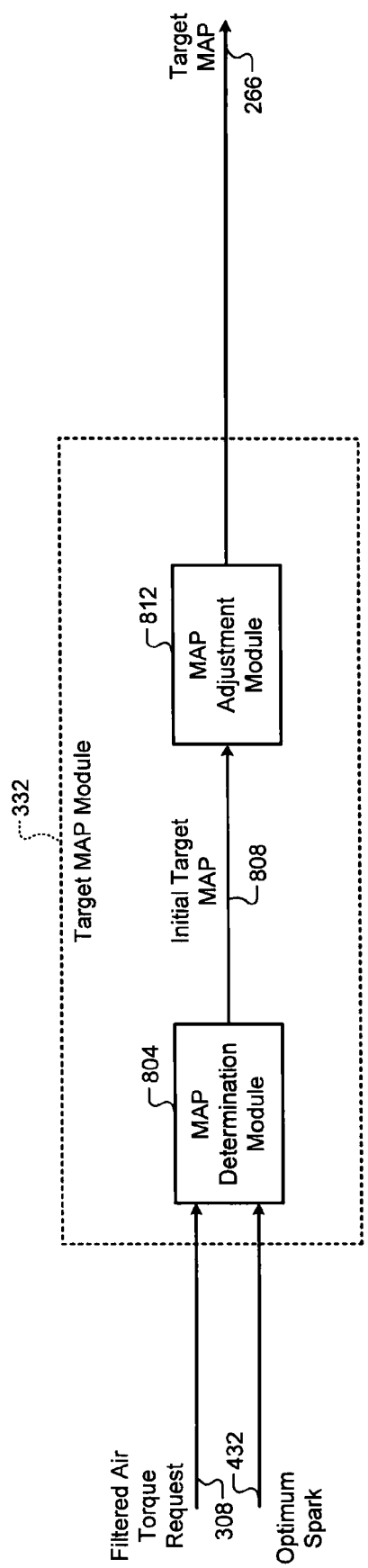
FIG. 8 is a functional block diagram of an example target manifold absolute pressure (MAP) module according to the present disclosure.

As shown in FIG. 3, a target MAP module 332 generates the target MAP 266 based on the filtered air torque request 308 and the optimum spark timing 432. FIG. 8 is a functional block diagram of an example implementation of the target MAP module 332.

Referring now to FIGS. 3 and 8, a MAP determination module 804 determines an initial target MAP 808 based on the filtered air torque request 308 and the optimum spark timing 432. The initial target MAP 808 may correspond to an estimated MAP that will be present with the filtered air torque request 308 and the optimum spark timing 432. The MAP determination module 804 generates the initial target MAP 808 further based on other engine operating parameters. For example, the MAP determination module 804 may determine the initial target MAP using the relationship:

$$MAP_{IT} = f^{-1}(T_F, RPM, S, I, E, AF, OT, \#), \qquad (10)$$

where $MAP_{IT}$ is the initial target MAP 808, $T_F$ is the filtered air torque request 308, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, # is the present number of cylinders that are activated, and $f^{-1}$ denotes inversion of the relationship between MAP and torque underlying, for example, relationships (3), (4), and (6), described above. The relationship may be embodied as an equation or as a look-up table.

A MAP adjustment module 812 may adjust the initial target MAP 808 to produce the target MAP 266. For example, the MAP adjustment module 812 may adjust the initial target MAP 808 based on a TIAP offset to produce the target MAP 266. The TIAP offset may be calibratable and may be set, for example, to offset a difference between the TIAP 480 and the MAP 444. As stated above, the boost control module 248 generates the target duty cycle 269 based on the target MAP 266, and the boost actuator module 164 applies a signal to the waste gate 162 based on the target duty cycle 269.

Figure 9:
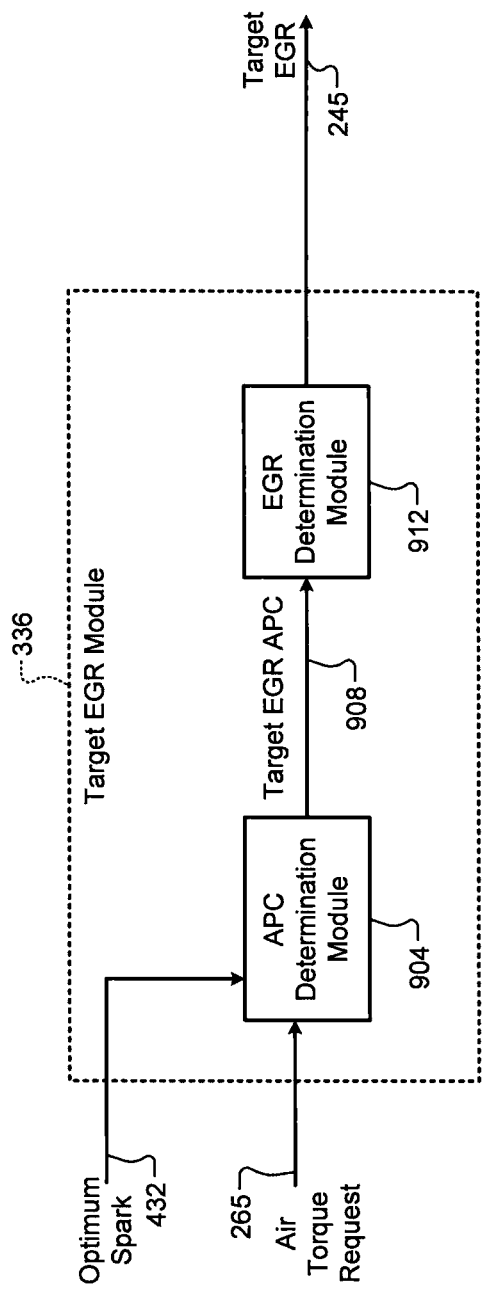
FIG. 9 is a functional block diagram of an example target exhaust gas recirculation (EGR) module according to the present disclosure.

As shown in FIG. 3, a target EGR module 336 generates the target EGR opening 245 based on the air torque request 265 and the optimum spark timing 432. FIG. 9 is a functional block diagram of an example implementation of the target EGR module 336.

Referring now to FIGS. 3 and 9, an APC determination module 904 determines a target APC for EGR control (target EGR APC) 908 based on the air torque request 265 and the optimum spark timing 432. The target EGR APC 908 may correspond to an estimated amount (e.g., mass) of air that will be drawn into the cylinders of the engine 102 with the air torque request 265 and the optimum spark timing 432. The APC determination module 904 determines the target EGR APC 908 further based on other engine operating parameters. For example, the APC determination module 804 may generate the target EGR APC 908 using the relationship:

$$APC_{EGR} = f^{-1}(T_A, RPM, SAE, AF, OT, \#), \qquad (11)$$

where $APC_{EGR}$ is the target EGR APC 908, $T_A$ is the air torque request 265, RPM is the engine speed 412, S is the optimum spark timing 432, I is an intake cam phaser angle, E is an exhaust cam phaser angle, AF is an air/fuel ratio being used by the fuel actuator module 124, OT is the oil temperature, # is the present number of cylinders that are activated, and $f^{-1}$ denotes inversion of the relationship between APC and torque underlying, for example, relationships (2), (5), (7), and (9), described above. The relationship may be embodied as an equation or as a look-up table.

An EGR determination module 912 generates the target EGR flowrate 245 based on the target EGR APC 908. For example, the EGR determination module 912 may determine the target EGR flowrate 245 using a function or a mapping that relates the target EGR APC 908 to the target EGR flowrate 245. As stated above, the EGR control module 244 determines the target EGR opening 246 based on the target EGR flowrate 245. The EGR actuator module 172 actuates the EGR valve 170 to produce the target EGR opening 246.

Figure 10:
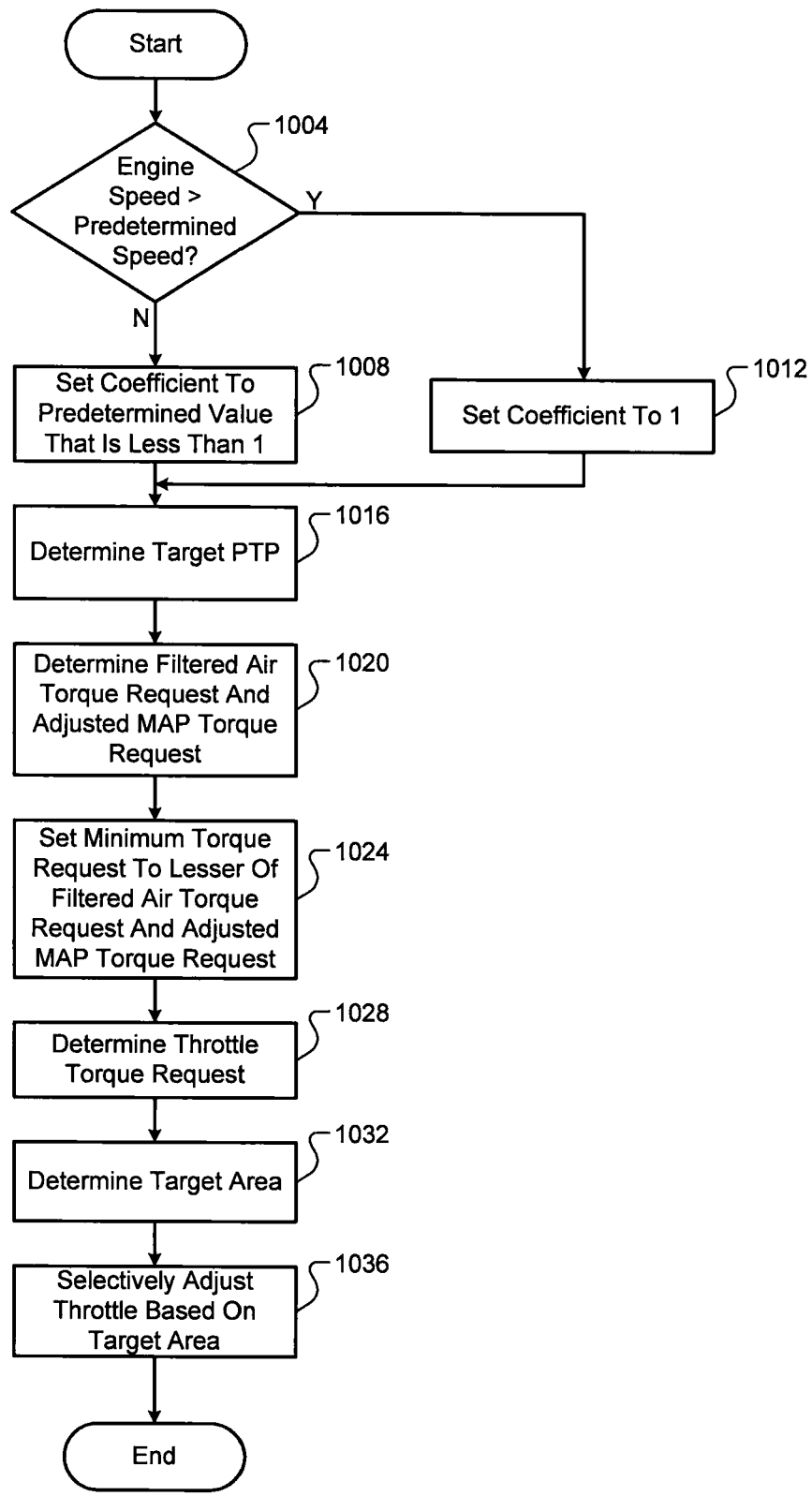
FIG. 10 includes a flowchart depicting an example method of controlling a throttle valve according to the present disclosure.

Referring now to FIG. 10, a functional block diagram of an example method of controlling the throttle valve 112 to limit induction noise is presented. Control may begin with 1004 where the target pressure module 476 determines whether the engine speed 412 is greater than the predetermined speed, such as approximately 2000 RPM or greater. If false, the target pressure module 476 may set the induction noise value to a predetermined value that is less than 1 at 1008, such as approximately 0.97 or 0.98. Setting the induction noise value to less than 1 will cause opening of the throttle valve 112 to be reduced to limit induction noise. If true, the target pressure module 476 may set the induction noise value equal to 1 at 1012. Control continues with 1016 after 1008 or 1012.

At 1016, the target pressure module 476 determines the target PTP 472. The target pressure module 476 may set the target PTP 472 equal to or based on a product of the TIAP 480 and the induction noise value. At 1020, the filtering module 404 determines the filtered air torque request 308 based on the air torque request 265, and the first summer module 456 determines the adjusted MAP torque request 460 based on the torque error 452 and the second MAP estimated torque 464.

The minimum module 484 sets the minimum torque request 312 equal to the lesser (minimum) one of the adjusted MAP torque request 460 and the filtered air torque request 308 at 1024. At 1028, the second summer module 488 determines the throttle torque request 316 based on the minimum torque request 312 and the torque adjustment 492.

The target opening module 324 generates the target throttle opening 267 for the throttle valve 112 based on the throttle torque request 316 at 1032. The target opening module 324 generates the target throttle opening 267 as discussed above. At 1036, the throttle actuator module 116 selectively adjusts the throttle valve 112 to produce the target throttle opening 267. While control is shown and discussed as ending after 1036, FIG. 10 may be illustrative of one control loop and control loops may be performed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A throttle control system, comprising:
a target pressure module that determines an induction noise value based on an engine operating parameter and that determines a target pressure downstream of a throttle valve of an engine based on one of: (i) a sum of a pressure at an inlet of the throttle valve and the induction noise value; and (ii) a product of the pressure at the inlet of the throttle valve and the induction noise value;
a torque determination module that determines a torque request for the engine based on the target pressure; and
a target opening module that determines a target opening for the throttle valve based on the torque request and that selectively adjusts opening of the throttle valve based on the target opening.

2. The throttle control system of claim 1 wherein the target pressure module determines the induction noise value based on an engine speed.

3. The throttle control system of claim 2 wherein the target pressure module sets the induction noise value to a first predetermined value when the engine speed is greater than a predetermined speed and sets the induction noise value to a second predetermined value when the engine speed is less than the predetermined speed.

4. The throttle control system of claim 3 wherein the first predetermined value is greater than the second predetermined value.

5. The throttle control system of claim 4 wherein the target opening module sets the target opening to a first value when the induction noise value is set to the first predetermined value and sets the target opening to a second value when the induction noise value is set to the second predetermined value, wherein the first value is less than the second value.

6. The throttle control system of claim 3 wherein the target pressure module sets the induction noise value based on a comparison of the engine speed and at least one predetermined speed.

7. The throttle control system of claim 1 wherein the target pressure module:
determines the target pressure downstream of the throttle valve based on (ii) the product of the pressure at the inlet of the throttle valve and the induction noise value;
sets the induction noise value greater than or equal to 1 when an engine speed is greater than a predetermined speed; and
sets the induction noise value to less than 1 when the engine speed is less than the predetermined speed.

8. The throttle control system of claim 1 wherein the target pressure module;
determines the target pressure downstream of the throttle valve based on (i) the sum of the pressure at the inlet of the throttle valve and the induction noise value;
sets the induction noise value to 0 when an engine speed is greater than a predetermined speed; and
sets the induction noise value to less than 0 when the engine speed is less than the predetermined speed.

9. A throttle control method, comprising:
determining an induction noise value based on an engine operating parameter;
determining a target pressure downstream of a throttle valve of an engine based on one of: (i) a sum of a pressure at an inlet of the throttle valve and the induction noise value; and (ii) a product of the pressure at the inlet of the throttle valve and the induction noise value;
determining a torque request for the engine based on the target pressure;

determining a target opening for the throttle valve based on the torque request; and selectively adjusting opening of the throttle valve based on the target opening.

10. The throttle control method of claim 9 further comprising determining the induction noise value based on an engine speed.

11. The throttle control method of claim 10 further comprising:

setting the induction noise value to a first predetermined value when the engine speed is greater than a predetermined speed; and setting the induction noise value to a second predetermined value when the engine speed is less than the predetermined speed.

12. The throttle control method of claim 11 wherein the first predetermined value is greater than the second predetermined value.

13. The throttle control method of claim 12 further comprising:

setting the target opening to a first value when the induction noise value is set to the first predetermined value; and setting the target opening to a second value when the induction noise value is set to the second predetermined value, wherein the first value is less than the second value.

14. The throttle control method of claim 11 further comprising setting the induction noise value based on a comparison of the engine speed and at least one predetermined speed.

15. The throttle control method of claim 9, wherein the determining the target pressure downstream of the throttle valve includes determining the target pressure downstream of the throttle valve based on (ii) the product of the pressure at the inlet of the throttle valve and the induction noise value, the throttle control method further comprising:

setting the induction noise value greater than or equal to 1 when an engine speed is greater than a predetermined speed; and setting the induction noise value to less than 1 when the engine speed is less than the predetermined speed.

16. The throttle control method of claim 9, wherein the determining the target pressure downstream of the throttle valve includes determining the target pressure downstream of the throttle valve based on (i) the sum of the pressure at the inlet of the throttle valve and the induction noise value, the throttle control method further comprising:

setting the induction noise value to 0 when an engine speed is greater than a predetermined speed; and setting the induction noise value to less than 0 when the engine speed is less than the predetermined speed.

* * * * *